United States Patent [19]
Nielinger et al.

[11] Patent Number: 5,597,888
[45] Date of Patent: Jan. 28, 1997

[54] PROCESS FOR THE PRODUCTION OF HIGH MOLECULAR WEIGHT POLYAMIDE 6

[75] Inventors: Werner Nielinger; Andreas Gittinger, both of Krefeld; Edgar Ostlinning, Düsseldorf; Karsten-Josef Idel; Helmut Schulte, both of Krefeld, all of Germany

[73] Assignee: Bayer Aktiengesellschaft, Leverkusen, Germany

[21] Appl. No.: 488,819

[22] Filed: Jun. 9, 1995

[30] Foreign Application Priority Data

Jun. 21, 1994 [DE] Germany .................. 44 21 704.8

[51] Int. Cl.⁶ .................. C08G 69/04; C08G 69/16; C08G 69/28
[52] U.S. Cl. .................. 528/335; 528/323; 528/324; 528/331; 528/329.1; 528/336; 528/338; 528/339

[58] Field of Search .................. 528/323, 324, 528/331, 336, 335, 329.1, 338, 339

[56] References Cited

U.S. PATENT DOCUMENTS

| | | | |
|---|---|---|---|
| 3,940,373 | 2/1976 | Muraki et al. | 528/324 |
| 4,465,821 | 8/1984 | Nielinger et al. | 528/324 |
| 4,816,557 | 3/1989 | Pipper et al. | 528/324 |
| 5,030,709 | 7/1991 | Pipper et al. | 528/324 |
| 5,039,786 | 8/1991 | Pipper et al. | 528/324 |
| 5,306,804 | 4/1994 | Liehr et al. | 528/324 |

*Primary Examiner*—Jeffrey C. Mullis
*Assistant Examiner*—P. Hampton-Hightower
*Attorney, Agent, or Firm*—Connolly & Hutz

[57] ABSTRACT

The invention relates to a process for the production of high molecular weight polyamide 6 (polycaprolactam).

13 Claims, No Drawings

PROCESS FOR THE PRODUCTION OF HIGH MOLECULAR WEIGHT POLYAMIDE 6

FIELD OF THE INVENTION

This invention relates to a process for the production of high molecular weight polyamide 6 (polycaprolactam).

BACKGROUND OF THE INVENTION

Polyamides are used for the production of containers of various kinds by virtue of their excellent properties, including their high strength and toughness and their high resistance to chemicals. For example, fuel oil tanks or petrol tanks for motor vehicles are produced by anionic polymerization of caprolactam. This process is particularly suitable and economical for large-volume containers.

Smaller containers, such as bottles and canisters, can be produced by extrusion blowing. This process requires polyamides of high melt viscosity to guarantee the necessary stability of the tube of melt during its extrusion. Accordingly, the size of the containers which can be produced by this process is limited by the melt viscosity or rather the molecular weight of the polyamide.

Accordingly, it is possible with an extremely high molecular weight polycaprolactam to produce even relatively large containers and tanks by extrusion blowing.

High-viscosity polyamides for extrusion are generally produced by subjecting low-viscosity standard material containing no molecular weight regulators to solid-phase post-condensation. The molecular weights of the products achieved in this way are often slightly variable and are not sufficient for the production of small or medium-size containers.

SUMMARY OF THE INVENTION

It has now been found that a polycaprolactam of distinctly higher molecular weight is obtained when a low molecular weight polyamide produced with addition of a little polycarboxylic acid is subjected to post-condensation. This result is surprising because the addition of carboxyfunctional compounds during the polymerization of caprolactam results in a reduction in molecular weight.

The present invention relates to a process for the production of high molecular weight polyamide 6 with a relative viscosity of >5.5 by hydrolytic polymerization of caprolactam and post-condensation of the product obtained in the solid phase, characterized in that the hydrolytic polymerization is carried out with addition of a carboxylic acid containing at least two carboxyl groups.

DESCRIPTION OF PREFERRED EMBODIMENTS

The polyamides produced in accordance with the invention are particularly suitable for the production of molded articles (moldings) by extrusion blowing.

The hydrolytic polymerization of caprolactam is carried out discontinuously or continuously by known methods, preferably continuously in a VK tube.

To produce polyamide 6 (polycaprolactam), a mixture of caprolactam and ω-aminocaproic acid, i.e. 0 to 100% by weight of caprolactam and 0 to 100% by weight of ω-aminocaproic acid, may be used as the caprolactam.

Suitable carboxylic acids containing at least two carboxyl groups are aliphatic, cycloaliphatic and aromatic dibasic and polybasic carboxylic acids, for example adipic acid, azelaic acid, sebacic acid, decane dicarboxylic acid, cyclohexane dicarboxylic acid, terephthalic acid, isophthalic acid, trimesic acid. Dicarboxylic and tricarboxylic acids, especially adipic acid, sebacic acid and terephthalic acid, are preferred. The polycarboxylic acids are used in such quantities that the percentage of carboxyl groups amounts to 0.0004 to 0.00005 mole and preferably to 0.0003 to 0.0001 mole of carboxyl groups per 100 g of polycaprolactam.

In the practical application of the process, a polyamide 6 with a relative viscosity of 2 to 4 (25° C., Ubbelohde viscosimeter, 1% by weight in m-cresol) is produced in a first stage from caprolactam/ω-aminocaproic acid with addition of the carboxylic acid containing at least two carboxyl groups at a temperature above the melting point of polyamide 6. The polyamide 6 thus produced is worked up and granulated in the usual way.

The granules obtained are then kept in an inert gas atmosphere (for example nitrogen) for 5 to 70 hours at a temperature of 160° to 200° C. and preferably at a temperature of 170° to 190° C.

In this post-condensation phase, the relative viscosity is increased to at least 5.5 (25° C., Ubbelohde viscosimeter, 1% in m-cresol).

The polyamides produced in accordance with the invention may contain the usual auxiliaries and additives, such as processing aids, nucleating agents, stabilizers, dyes and pigments, fillers and reinforcing materials.

In general, the auxiliaries are mixed with the granules, optionally in the form of a concentrate, before processing of the polyamide. Additives which do not influence the post-condensation phase may also be incorporated in the low molecular weight polycaprolactam by compounding. This is the preferred process for the incorporation of fillers and reinforcing materials, such as glass fibers.

The polyamides produced in accordance with the invention are preferably used for the production of containers and tanks by extrusion blowing or co-extrusion blowing. They may of course also be used for the production of other molded articles, such as profiles, bars, tubes, rails, by extrusion.

EXAMPLES

A mixture of 91 g of caprolactam and 10.43 g of aminocaproic acid is polymerized with addition of varying amounts of azelaic acid. The polymerization is carried out with stirring in a nitrogen atmosphere for 1 hour at 200° C. and 5 hours at 250° C. After extraction with water, the polyamide granules are post-condensed for 24 hours with nitrogen heated to 180° C.

The relative viscosities of the starting product and the post-condensed polyamide, as measured on a 1% solution of the polyamide in m-cresol at 25° C. in an Ubbelohde viscosimeter, are shown in the following Table.

| Dicarboxylic acid [moles COOH/100 g] | Relative viscosity | |
| --- | --- | --- |
| | Starting product | Post-condensed product |
| — | 3.4 | 5.2 |
| 0.0001 | 3.6 | 5.7 |
| 0.00005 | 3.7 | 5.65 |

-continued

| Dicarboxylic acid [moles COOH/100 g] | Relative viscosity | |
|---|---|---|
| | Starting product | Post-condensed product |
| 0.00027 | 3.5 | 5.7 |
| Comparison 0.0005 | 3.5 | 5.4 |

We claim:

1. A process for the production of polyamide 6 with a relative viscosity of >5.5 by hydrolytic polymerization of caprolactam and post-condensation of the product obtained in the solid phase, wherein the hydrolytic polymerization is carried out with addition of a carboxylic acid containing at least two carboxyl groups in quantities of 0.0004 to 0.00005 mole, based on 100 g of caprolactam.

2. A process for the production of polycaprolactam as claimed in claim 1, wherein a dicarboxylic acid is used as the polycarboxylic acid.

3. A process for the production of polycaprolactam as claimed in claim 1, wherein a tricarboxylic acid is used as the polycarboxylic acid.

4. The process of claim 1 wherein the carboxylic acid is aliphatic, cycloaliphatic, aromatic dibasic or polybasic.

5. The process of claim 1 wherein the acid is selected from the group consisting of adipic acid, azelaic acid, sebacic acid, decane dicarboxylic acid, cyclohexane dicarboxylic acid, terephthalic acid, isophthalic acid, and trimesic acid.

6. The process of claim 1, wherein the acid is adipic acid.

7. The process of claim 1, wherein the acid is sebacic acid.

8. The process of claim 1, wherein the acid is terephthalic acid.

9. The process of claim 5, wherein the carboxylic acid is present in an amount of 0.0003 to 0.0001 mole of carboxyl groups per 100 g of polycaprolactam.

10. The process of claim 6, wherein the carboxylic acid is present in an amount of 0.0003 to 0.0001 mole of carboxyl groups per 100 g or polycaprolactam.

11. The process of claim 7, wherein the carboxylic acid is present in an amount of 0.0003 to 0.0001 mole of carboxyl groups per 100 g of polycaprolactam.

12. The process of claim 8, wherein the carboxylic acid is present in an amount of 0.0003 to 0.0001 mole of carboxyl groups per 100 g of polycaprolactam.

13. The process of claim 1, wherein the carboxylic acid is present in an amount of 0.0003 to 0.0001 mole of carboxyl groups per 100 g of polycaprolactam.

* * * * *